March 25, 1958   J. NAAB   2,828,171
COMPRESSOR PISTON
Filed April 4, 1957

INVENTOR
JULIUS NAAB
BY
HIS ATTORNEY

United States Patent Office 2,828,171
Patented Mar. 25, 1958

2,828,171

COMPRESSOR PISTON

Julius Naab, Easton, Pa., assignor to Ingersoll-Rand Company, New York, N. Y., a corporation of New Jersey Application April 4, 1957, Serial No. 650,708

3 Claims. (Cl. 309—35)

This invention relates to improvements in pistons for air or gas compressors, engines or analogous mechanisms of the reciprocating type.

An object of the present invention is to provide a means of constantly maintaining a piston ring in contact with the cylinder wall, including a spring constantly urging the ring radially outward against the wall of a piston chamber, the spring being prevented from expanding out of its peripheral groove and scoring the cylinder wall.

Figure 1:
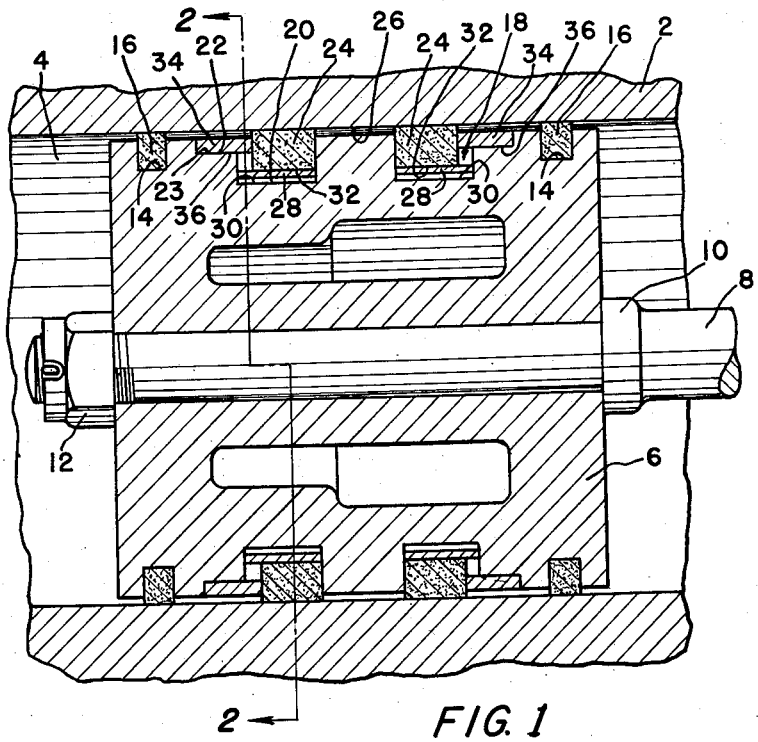
Figure 2:
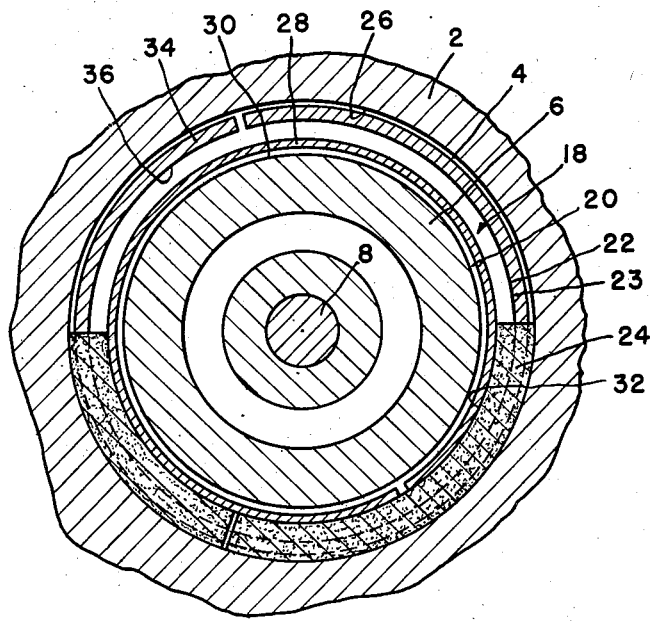

Other objects will become obvious from the following specification and drawings, in which Figure 1 is a longitudinal view, partly in section, of a compressor cylinder showing the piston constructed in accordance with this invention, and Fig. 2 is a transverse section of the piston and confronting cylinder walls taken along the line 2—2 of Fig. 1 looking in the direction indicated by the arrows.

Referring to the drawings, a cylinder 2 has a piston 6 slidably mounted in the piston chamber 4 thereof for reciprocatory movement. A piston rod 8 is connected to the piston 6 and held in place by means of a shoulder 10 of the piston rod 8 and a nut 12 screwed on the threaded end of the piston rod 8. Formed in the opposite ends of the piston 6 are peripheral encircling grooves 14 for receiving bearing rings 16. Also formed in the piston 6 are peripheral encircling grooves 18 for receiving sealing rings 24. Each groove 18 is stepped in cross section and consists of a greater depth portion 20, which receives the sealing ring 24 together with a ring spring 28, and a lesser depth portion 22, which receives a retainer ring 34 for preventing the spring 28 from expanding beyond the periphery of the piston and scoring the cylinder wall 26. The sides of each groove 18 are parallel.

In the particular embodiment shown, the piston 6 is of the non-lubricated type, and the sealing rings 24 are of the self-lubricating type, being of such a material as graphitized carbon. The sealing rings 24 are split in order to permit assembly on the piston.

When in use, graphitized carbon rings are subject to a wearing away. In order to maintain close contact between the sealing rings 24 and the cylinder wall 26 and to compensate for the wearing away of the graphitized carbon, each sealing ring 24 is constantly urged radially outward against the cylinder wall 26 by a spring 28 which is disposed in the greater depth portion 20 of each groove 18 between the bottom 30 thereof and the inner side 32 of each sealing ring 24. The spring 28 shown is roughly annular in shape and is split in order to permit insertion into the groove 18. The relaxed outer diameter of each spring 28 is substantially as great as or greater than the diameter of the piston 6 in order that it may constantly urge the sealing ring 24 outward against the cylinder wall 26.

When the sealing ring 24 has worn thin or has broken, it is necessary that the spring 28 be prevented from expanding out of the groove 18 and scoring the cylinder wall 26. To this end, a retainer ring 34 is disposed in the lesser depth portion 22 of the groove 18 and extends transversely into the greater depth portion 20, so that the spring 28 can expand radially only until it abuts the inner side 36 of the retainer ring 34. Each retainer ring has an inner diameter slightly smaller than the diameter of the bottom 23 of the lesser depth portion 22 so as to cling to the bottom 23 of the lesser depth portion 22 of the groove 18.

In order that the retainer ring 34 may prevent the spring 28 from scoring the cylinder wall 26, it is necessary that the retainer ring 34 extend into the greater depth portion 20, and in the particular embodiment shown, this is accomplished by making the retainer ring 34 wider than the lesser depth portion 22. With this construction, it is also necessary that the spring 28 be wider than the difference between the width of the retainer ring 34 and the width of the groove 18. Furthermore, the spring 28, in order to be insertable into the greater depth portion 20, may not be wider than the greater depth portion 20. The sum of the widths of the retainer ring 34 and the sealing ring 24 should be substantially equal to the width of the groove 18.

I claim:

1. A piston having a peripheral encircling groove, said groove comprising a greater depth portion and a lesser depth portion, a piston sealing ring disposed in said greater depth portion, a spring disposed in said greater depth portion of said groove between the bottom thereof and the inner side of said sealing ring constantly urging said sealing ring radially outward, said spring having a minimum width greater than the width of said sealing ring and a maximum width less than the width of said greater depth portion of said groove, said spring having a relaxed outer diameter at least as great as the outer diameter of said piston, and a retainer ring disposed in said lesser depth portion and extending transversely into said greater depth portion for limiting the outward expansion of said spring so that said spring can expand only until it abuts the inner side of said retainer ring.

2. A piston having a peripheral encircling groove, said groove comprising a greater depth portion and a lesser depth portion, a piston sealing ring disposed in said greater depth portion, said sealing ring being less wide in the direction of the axis of said sealing ring than the width of said greater depth portion, a split roughly annular spring disposed in said greater depth portion of said groove between the bottom thereof and the inner side of said sealing ring constantly urging said sealing ring radially outward, said spring having a width greater than the width of said sealing ring and less than the width of said greater depth portion of said groove, and a retainer ring held in said lesser depth portion and extending into said greater depth portion for limiting the outward expansion of said spring so that said spring can expand only until it abuts the inner side of said retainer ring.

3. A piston having a peripheral encircling groove, said groove being stepped in cross section and comprising a greater depth portion and a lesser depth portion, a piston sealing ring disposed in said greater depth portion, said sealing ring being less wide in the direction of the axis of said sealing ring than the width of said greater depth portion, a split roughly circular spring disposed in said greater depth portion of said groove between the bottom thereof and the inner side of said sealing ring constantly urging said sealing ring radially outward, said spring having a width greater than the width of said sealing ring and less than the width of said greater depth portion of said groove, and a retainer ring held in said lesser depth portion, said retainer ring being wider in the direction of the axis of said retainer ring than said lesser depth portion of said groove so as to extend into said greater depth portion for limiting the outward expansion of said spring so that said spring can expand only until it abuts the inner side of said retainer ring.

References Cited in the file of this patent

UNITED STATES PATENTS

| | | |
|---|---|---|
| 357,777 | McCart | Feb. 15, 1887 |
| 627,707 | Price | June 27, 1899 |
| 2,774,639 | Naab | Dec. 18, 1956 |